United States Patent [19]
Kollath et al.

[11] Patent Number: 5,725,381
[45] Date of Patent: Mar. 10, 1998

[54] MOTIVATION SYSTEM FOR CHILDREN

[76] Inventors: Richard Craig Kollath, 12336 Rollingwood Ct., Gulfport, Miss. 39503; Richard Lee Huffman, 520 Beach Blvd. #501, Biloxi, Miss. 39530

[21] Appl. No.: 725,168
[22] Filed: Oct. 3, 1996
[51] Int. Cl.⁶ .................................. G09B 19/00
[52] U.S. Cl. ........................................ 434/238
[58] Field of Search .......................... 434/236, 237, 434/238; 283/115

[56] References Cited

U.S. PATENT DOCUMENTS

| | | | |
|---|---|---|---|
| 2,340,139 | 1/1944 | Norford . | |
| 2,414,614 | 1/1947 | Shurick, Sr. | 434/238 |
| 2,883,765 | 4/1959 | Blaine | 434/238 |
| 2,918,730 | 12/1959 | Schrade | 434/238 |
| 3,035,355 | 5/1962 | Holmes | 434/238 |
| 4,776,799 | 10/1988 | Walsh | 434/238 |
| 4,909,740 | 3/1990 | Rankin | 283/115 |
| 5,035,626 | 7/1991 | Persing | 434/408 |
| 5,261,702 | 11/1993 | Mayfield | 283/115 |
| 5,288,233 | 2/1994 | Green | 434/238 |
| 5,393,100 | 2/1995 | Coe | 283/115 |
| 5,429,373 | 7/1995 | Chelko et al. | 434/238 |
| 5,482,487 | 1/1996 | Harris | 446/8 |
| 5,573,404 | 11/1996 | Stawski, II | 434/238 |
| 5,577,915 | 11/1996 | Feldman | 434/238 |

Primary Examiner—Paul J. Hirsch
Attorney, Agent, or Firm—Hardaway Law Firm PA

[57] ABSTRACT

A motivation system for children is provided, which consists of a motivation system board, play money of various denominations, and coupons for various predefined rewards. The motivation system board consists of a flat rectangular rigid sheet with a schedule information area, a rewards information area, and an erasable felt tip marking pen with a pen holder. The schedule information area contains a first column for listing the time of day, a second column for listing the behavior the child is to perform, and a third column for listing the quantity of play money to be received by the child. The rewards information area contains a first column for listing rewards that may be purchased, and a second column for listing the play money purchase price of reward.

6 Claims, 3 Drawing Sheets

MOTIVATION SYSTEM FOR CHILDREN

CROSS REFERENCE TO RELATED DOCUMENTS

The instant invention is the subject matter of Disclosure Document No. 399844, filed in the PTO on Jul. 8, 1996 and it is respectfully requested that this document be retained beyond the two-year period so that it may be relied upon as evidence of conception of the invention during the prosecution phase of this application, should the need arise.

BACKGROUND—FIELD OF THE INVENTION

The present invention relates to the fields of parenting, education, and behavioral motivational devices, particularly for children.

BACKGROUND—DESCRIPTION OF THE PRIOR ART

The use of various types of motivational devices is known in the prior art. A desirable feature of a motivational system is that it includes flexibility to meet the family's particular value system. It should also be flexible to allow modification to match the child's changing maturity level. It should allow the parents to clearly identify the child behaviors that are desired. The motivational system should also include a daily schedule that identifies when the behavior is to occur. The motivation system should provide enjoyable rewards for desirable behaviors and provide negative incentives for undesirable behaviors. To be most effective, the motivational system should allow the child to have some choice in the rewards received. Prior art motivational devices do not include a daily schedule and are based upon different rigidly specified behaviors, such as only school grades, and are rigidly rewarded. For example, play money is received that can only be used to purchase TV time.

By the way of example, the prior art disclosed in U.S. Pat. No. 5,482,487 to HARRIS (1996) describes play money to be earned and spent by children. It also describes a bank used for storage of the play money. This invention describes a method of rewards for achieving good school grades. This invention does not provide a mechanism for motivating the child to perform other than scholastic achievement behaviors. It also does not provide the child with options for what he can do with the play money received. It also fails to provide a time schedule specifying when the scholastic achievements are to be attained.

U.S. Pat. No. 5,429,373 to CHELKO and CHELKO (1995) discloses a motivational savings bank set including token currency. This invention provides for only a single type of reward which is TV time. This invention fails to address many other more desirable rewards that may be used to provide child motivation. Many parents believe that TV time is not a benefit to the child and the parents would not approve of TV time as a suitable reward. This invention also provides for only the date (day/month/year) on which the activities are to be accomplished. It fails to provide for the time of day when each activity is to be accomplished to obtain the reward. If the parent wants to motivate their child to, for example, get out of bed by 7:00 AM, this invention is not suitable, because it does not provide a means for specifying a time schedule.

U.S. Pat. No. 2,883,765 to BLAINE (1959) relates to a child's chores recorder for producing incentive. Although this invention provides an incentive using authentic money for accomplishing chores during a day, it does not provide for setting a schedule that specifies the time of day the chore is to be completed. For example, a child may take the garbage can to the street during the day, but if it is done after the garbage truck has already gone by, then the chore is not satisfactorily completed. The child would say that he accomplished the chore as the invention indicated. The parent needs the capability to clearly identify what is required of the child, including the time when it is to be accomplished. Also, this system is designed to reward only activities that are classified as chores. Motivating children to perform other non-chorelike behaviors, such as "be ready for the school bus" or "be in bed" by a certain time are not possible with this described invention.

U.S. Pat. No. 2,414,614 to SHURICK (1945) describes a children's behavior indicator. This invention provides for a means of motivating the child to be "good" during the day. It fails to provide what detailed behaviors are expected and when during the day they should occur for the child to be evaluated as "good" to receive any reward.

U.S. Pat. No. 2,340,139 to NORFORD (1944) discloses an indicating climbing device. This invention provides an indicator of attaining a level of progression of activities. It fails to provide the fundamental motivation requirements as to what is expected of the child and when it is expected to occur. This invention also fails to provide a reward to the child as part of the motivation.

While these prior patents may be suitable for the particular purpose to which they address, they would not be as suitable for the purposes of the present invention as heretofore described.

OBJECTS AND ADVANTAGES

A primary object of the present invention is to provide a motivation system for children that will overcome the shortcomings of the prior art devices.

Another object is to provide a motivation system for children that is flexible to meet any family value system.

Yet also another object is to provide a motivation system for children that allows identifying a schedule of behaviors and amounts of play money to be received for successful completion of each behavior.

An additional object is to provide a motivation system for children that allows clearly identifying a list of rewards and their play money purchase price.

Yet another object is to provide a motivation system that allows the child a choice of rewards.

Another object is to provide a motivation system for children that includes a board constructed with a dry ink writable and erasable surface, thereby allowing flexibility to make changes easily.

Yet another object is to provide a motivation system for children that can be easily mounted and used on an indoor vertical surface of the home, such as a refrigerator door.

A further object is to provide a motivation system for children that is fun, simple, and easy to use.

A still further object is to provide a motivation system for children that is economical to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DRAWING FIGURES

Various other objects, features, and attendant advantages of the present invention will become more fully appreciated as the same becomes better understood when considered in conjunction with the accompanying drawings, in which like reference characters designate the same of similar parts throughout the several views, and wherein.

Similar reference characters denote corresponding features consistently throughout the attached drawings.

Figure 1:
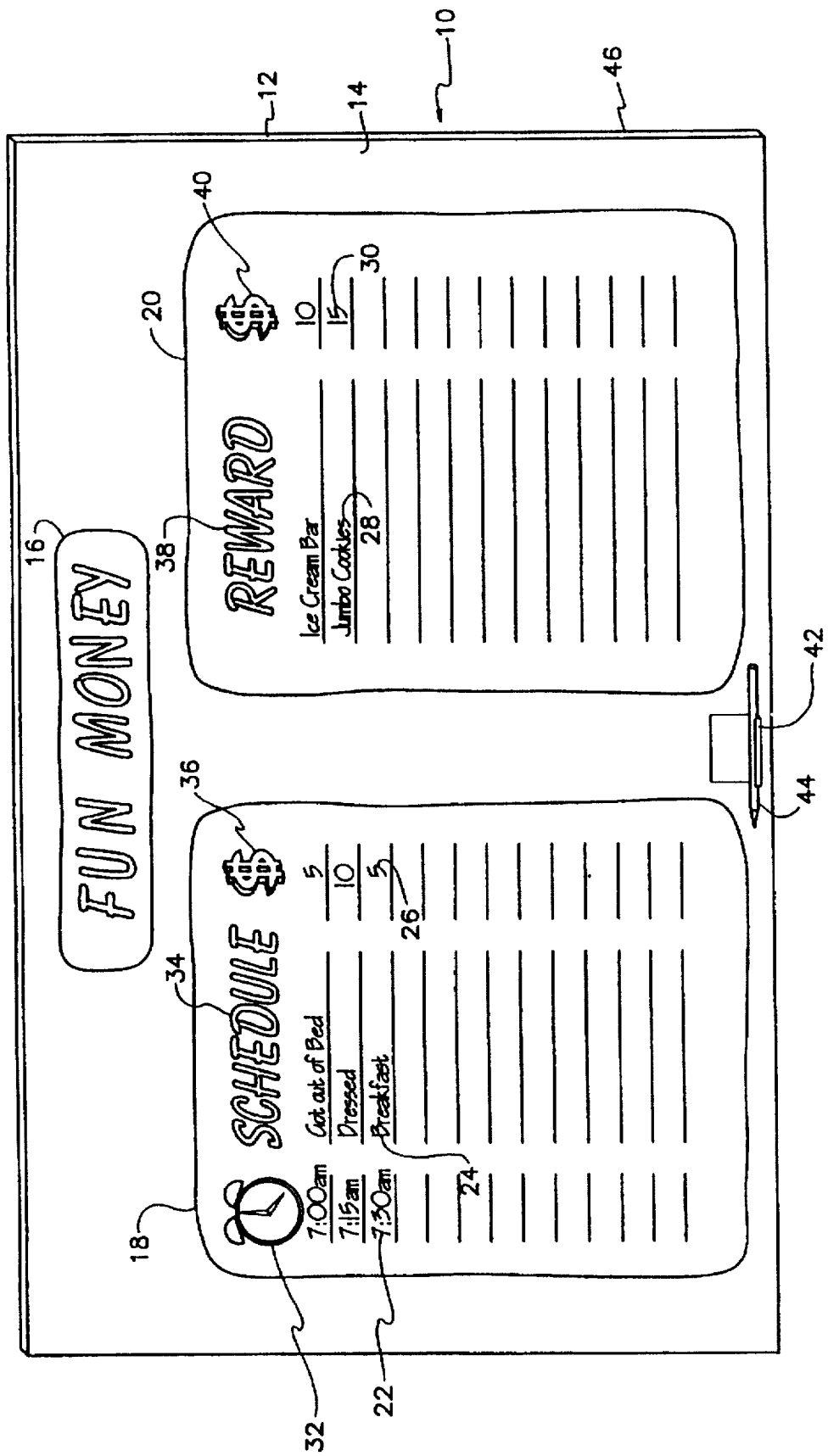
FIG. 1 is a front perspective view of the child motivation system board.
Figure 2:
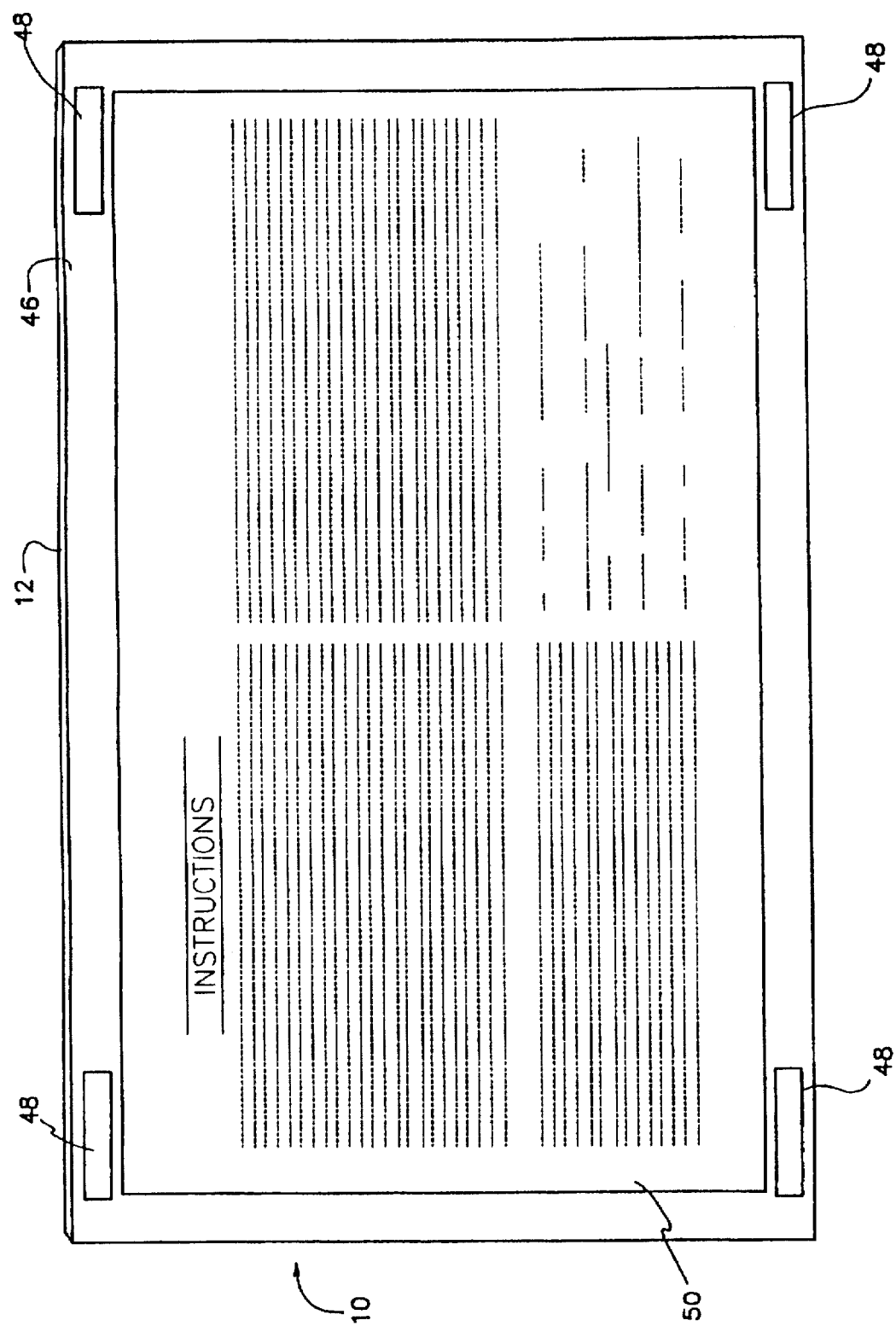
FIG. 2 is a rear view of the child motivation system board.
Figure 3:
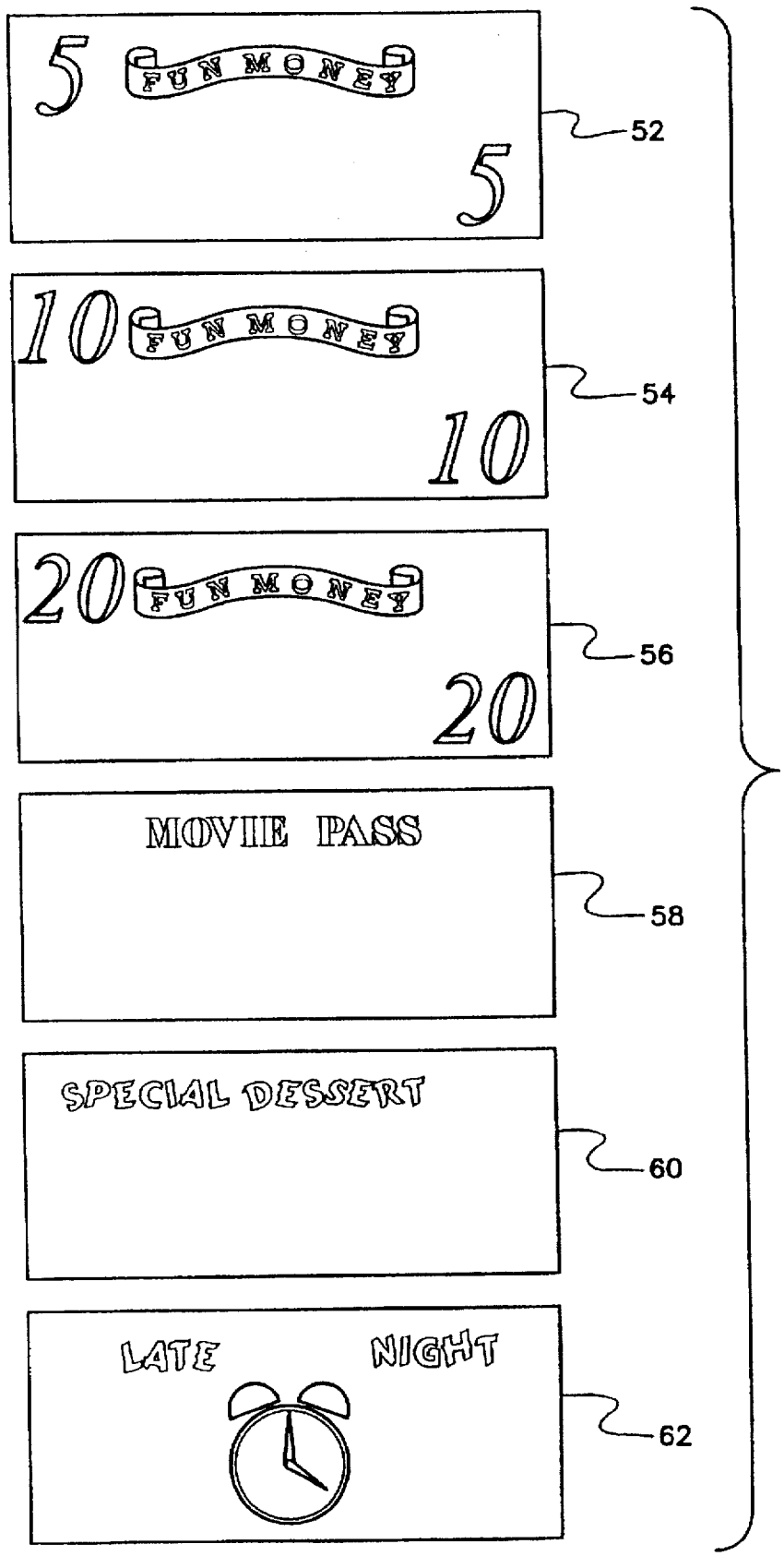
FIG. 3 is a composite view of the play money and coupons used as part of the child motivation system.

REFERENCE NUMERALS IN DRAWINGS 10 motivation system board
12 flat rectangular rigid sheet
14 clear coating
16 heading area
18 schedule information area
20 rewards information area
22 schedule information area 18 first column
24 schedule information area 18 second column
26 schedule information area 18 third column
28 rewards information area 20 first column
30 rewards information area 20 second column
32 column 22 heading area
34 column 24 heading area
36 column 26 heading area
38 column 28 heading area
40 column 30 heading area
42 marking pen holder
44 erasable felt tip marking pen
46 rigid sheet 12 rear surface
48 magnet strip
50 instruction sheet
52 $5 play money
54 $10 play money
56 $20 play money
58 movie pass coupon
60 special dessert coupon
62 late night coupon
Description Turning now descriptively to the drawings, FIG. 1 through FIG. 3 illustrate a motivation system for children consisting of motivation system board 10 and play money 52, 54, 56, and coupons 58, 60, 62.

Motivation system board 10 consists of a flat rectangular rigid sheet 12 with schedule information area 18 and rewards information area 20 disposed onto the rigid sheet 12 front surface and a marking pen holder 42 affixed by adhesive to the lower portion of the front surface of rigid sheet 12. An erasable felt tip marking pen 44 is held in the marking pen holder 42.

Schedule information area 18 contains a first column 22 consisting of a plurality of horizontal lines for listing the time of day, a second column 24 consisting of a plurality of horizontal lines for listing the behavior the child is to perform, and a third column 26 consisting of a plurality of horizontal lines for listing the quantity of play money to be received by the child for completing behavior 24 by the time of day listed in the first column 22.

Rewards information area 20 contains a first column 28 consisting of a plurality of horizontal lines for listing rewards that may be purchased, and a second column 30 consisting of a plurality of horizontal lines for listing the play money purchase price of reward listed in the first column 28.

The rigid sheet 12 front surface has a heading area 16 with a fanciful name printed thereon over schedule information area 18 and rewards information area 20. Column 22 has a heading area 32 with a figure of a clock printed thereon to represent time of day. Column 24 has a heading area 34 with the word "SCHEDULE" printed thereon. Column 26 has a heading area 36 with a figure of a dollar sign printed thereon to represent a quantity of play money. Column 28 has a heading area 38 with the word "REWARD" printed thereon. Column 30 has a heading area 40 with a figure of a dollar sign printed thereon to represent a quantity of play money.

Motivation system board 10 includes a flat rectangular rigid sheet 12 front surface and a durable clear coating 14 thereon, so that erasable felt tip marking pen 44 can be utilized to fill out information areas 18 and 20. The motivation system board can be reused by simply rubbing off the filled in information with the use of the erasable felt tip marking pen 44 on the clear coating 14.

FIG. 2 shows a rear view of the motivation system board 10. A magnet strip 48 is disposed at each corner on rear surface 46 of the rigid sheet 12 so that the motivation system board 10 can be secured to a magnetic flat surface (not shown) such as a refrigerator appliance front door.

Information sheet 50 with written instructions printed thereon is affixed by adhesive on rear surface 46 of the rigid sheet 12.

FIG. 3 shows a front view of the play money 52, 54, 56, and coupons 58, 60, 62 used with the child motivation system. The play money consists of paper sheets of various colors with ornamental artwork printed thereon. Play money 52 has the denomination amount of five dollars. Play money 54 has the denomination amount of ten dollars. Play money 56 has the denomination amount of twenty dollars. Each play money denomination is printed on paper of a unique color, such as pink for $5 bills, yellow for $10 bills, and green for $20 bills. Coupon 58 is a reward coupon good for one movie and is printed on paper of a unique color, such as purple. Coupon 60 is a reward coupon good for one special dessert and is printed on paper of a unique color, such as red. Coupon 62 is a reward coupon good for staying up late past the child's normal bedtime and is printed on paper of a unique color, such as blue.

OPERATION

To use the motivation system for children, the following steps should be taken by the parent or child's supervisor:

1. In the first column 22 of schedule information area 18, write with pen 44 the time the child's behavior is to start or end, for example "7:00 AM".

2. In the second column 24 of schedule information area 18, write the name of the desired behavior, for example "GET OUT OF BED".

3. In the third column 26 of schedule information area 18, write the amount of play money the child receives as a positive reinforcement for completing the behavior, for example "5"

4. Steps 1 through 3 may be repeated until schedule information area 18 is filled.

5. In the first column 28 of rewards information area 20, write the name of the reward the child can purchase, for example "ICE CREAM BAR".

6. In the second column 30 of rewards information area 20 write the reward's Play money purchase price, for example "10".

7. Steps 5 and 6 may be repeated until reward information area 20 is filled.

8. An undesirable behavior, such as name calling can cost the child play money as a negative reinforcement. For name calling, a predetermined amount of play money goes to the person called the name.

9. Coupons for predetermined rewards, such as movie, special desert, and late night may also be listed as rewards that can be purchased.

Summary, Ramifications, and Scope

This invention is a child motivation system which provides all the fundamentals to inspire good behavior in children. The fundamentals of inspiring good behavior in children are to 1) identify the behavior desired, 2) specify when the behavior is to be accomplished, 3) provide meaningful rewards for completing behaviors on time, and 4) allow the child to select the reward. This child motivation system is designed to be used as a tool by parents, teachers, and anyone responsible for supervising children. This child motivation system provides a flexible incentive system for both good and bad behaviors that is far more effective than prior art systems. The child can earn play money for desired behavior and the child can spend his play money on rewards desired by the child and approved of by the child's parent. Undesirable behavior results in the consequence of the child losing play money.

A schedule of behavior standards is clearly defined using this child motivation system. By following the parent's defined standards, the child receives enjoyable rewards. As rewards are received, the child develops desirable habits. After habits have been developed, the play money is replaced with encouragement and praise. This is to keep the child motivation system based on the child's desire to please and not on bribes. Child responsibilities should become habits, with the child not expecting rewards other than the parent's love and praise. This invention allows the definition of behavior standards to determined by the parent or supervisor completing the child motivation board. The child motivation system instructions encourage that the rewards be determined by both the parent and the child to make the rewards more meaningful and effective in achieving desired habits.

It will be understood that each of the elements described above, or two or more together may also find a useful application in other types of methods differing from the type described above.

While certain novel features of this invention have been shown and described in the annexed claims, in is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A motivation system for a child comprising:
   (A) a sheet, said sheet comprising:
      (1) a front surface, said front surface including:
         (a) a schedule area, said schedule area including:
            (i) a task listing area for displaying at least one task assigned to the child;
            (ii) a value listing area aligned with said task listing area for displaying a reward value for successfully completing said at least one task; and
            (iii) a time completion listing area aligned with said task listing area and said value listing area for displaying a time of day by which the child must perform said at least one task in order for said at least one task to be considered successfully completed;
         (b) a reward area, said reward area including:
            (i) a reward listing area for displaying at least one reward to be earned by the child; and
            (ii) a redemption value listing area aligned with said reward listing area for displaying an amount of reward value required by the child to redeem said at least one reward; and
      (2) a rear surface;
   (B) currency in various denominations for distribution to the child upon earning a value of an individual piece of currency; and
   (C) at least one coupon having a value and a reward for one of purchase by and distribution to the child upon earning said value of said coupon, said coupon adapted for redemption by the child to receive said reward of said coupon.

2. The motivation system for a child as recited in claim 1, further comprising an instruction listing area on said rear surface of said sheet for displaying instructions for said motivation system.

3. The motivation system for a child as recited in claim 2, said instruction listing area comprising a separate sheet adhesively secured to said rear surface of said sheet.

4. The motivation system for a child as recited in claim 1, said currency being false currency.

5. The motivation system for a child as recited in claim 1, further comprising:
   a writing implement for marking on said sheet;
   a support mounted on said sheet for supporting said writing implement.

6. A method of motivating a child, comprising:
   providing a sheet;
   displaying on said sheet a list of at least one task assigned to the child;
   displaying on said sheet a value for the successful completion of the at least one task;
   displaying on said sheet a time of day by which the child must perform the at least one task in order for the at least one task to be considered successfully completed;
   displaying on said sheet at least one reward to be earned by the child;
   displaying on said sheet a redemption value for the child to earn the at least one reward;
   providing currency in various denominations;
   providing at least one coupon, said at least one coupon having a value and a reward;
   allocating an individual piece of currency to the child upon earning a value of said individual piece of currency by the successful completion of said at least one task;
   allocating said at least one coupon to the child upon one of: a purchase by the child after earning said value of said coupon, and a distribution to the child after the child earns said value of said coupon by the successful completion of said at least one task; and
   distributing said reward to the child upon surrender of one of: currency equal to said value of said reward, and said coupon equal in value to said value of said reward.

* * * * *